No. 756,644. PATENTED APR. 5, 1904.
A. N. JOHNSON.
HYDRAULIC PRESSURE TESTING APPARATUS.
APPLICATION FILED AUG. 7, 1903.
NO MODEL.
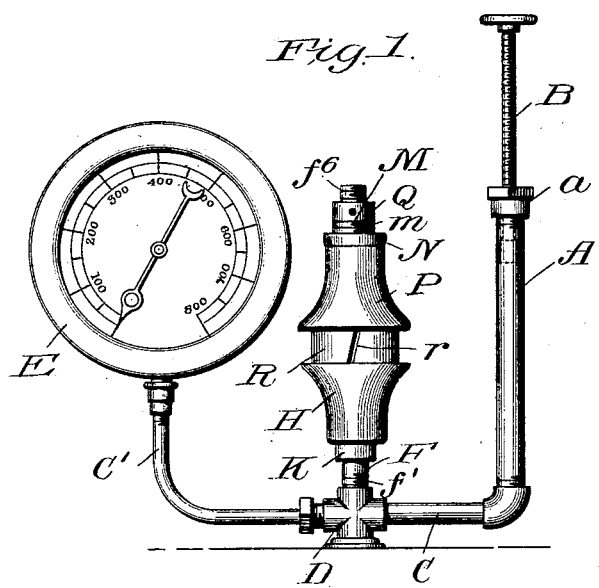
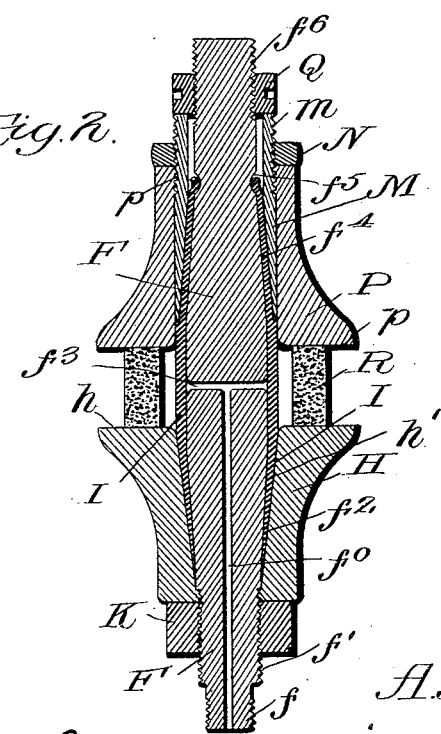
Inventor
A. N. Johnson.
Witnesses
By Wilkinson & Fisher,
Attorneys.

No. 756,644.

Patented April 5, 1904.

UNITED STATES PATENT OFFICE.

ARTHUR NEWHALL JOHNSON, OF BALTIMORE, MARYLAND.

HYDRAULIC PRESSURE-TESTING APPARATUS.

SPECIFICATION forming part of Letters Patent No. 756,644, dated April 5, 1904.

Application filed August 7, 1903. Serial No. 168,678. (No model.)

*To all whom it may concern:*

Be it known that I, ARTHUR NEWHALL JOHNSON, a citizen of the United States, residing at Baltimore, in the State of Maryland, have invented certain new and useful Improvements in Hydraulic Pressure-Testing Apparatus; and I do hereby declare the following to be a full, clear, and exact description of the invention, such as will enable others skilled in the art to which it appertains to make and use the same.

My invention relates to apparatus for testing strength of materials by hydraulic or pneumatic pressure. It may be used for testing materials of various kinds, but is more especially adapted for testing the tensile strength of materials of a brittle nature, as cement, rocks, plaster-of-paris, sulfur, &c. Moreover, while pneumatic pressure may be used for the apparatus, it is preferably operated with hydraulic pressure.

In the mode of testing cement now generally employed it has been found that with the same material and apparently under the same conditions it is difficult, if not impracticable, to obtain the same results. In the testing of cements the common practice has been to use some form of briquet with a diminished midsection, the large ends being caught in clips, by means of which the stress is applied and the briquet is thus pulled apart. These briquets after having been broken in the testing-machine show irregular areas of rupture, which may be due to the local weakness in the briquet or to transverse strains caused by the pressure developed at the point of support by the clips and to occasional twisting. These objections are believed to be largely, if not entirely, obviated by the hereinafter-described apparatus.

Reference is had to the accompanying drawings, in which—

Figure 1 is a front view showing the complete apparatus, and Fig. 2 is a central vertical section through the extensible rubber tube and the parts contiguous thereto.

A represents a cylinder containing water or other liquid and provided with a piston on the piston-rod B, which is screw-threaded and works through a nut $a$ at the top of the cylinder, and thus the motion of the piston may be regulated to a nicety. Screwing down on the piston-rod B will develop pressure on the fluid in the cylinder A and will transmit this pressure through the pipes C and the cross D to the pipe C' and the perforated block F. The pipe C is connected to a gage E, which shows the pressure of the fluid.

The block F is perforated, as at $f^0$ and $f^3$, (see Fig. 2,) and is screw-threaded at $f$, $f'$, and $f^6$. It is preferably also tapered, as at $f^2$ and $f^4$, and may be indented, as at $f^5$. On the outside of this block I stretch the rubber tube I, having its lower end clamped between the conical face $f^2$ of the block and conical surface $h'$ on the interior of the cap H. On the screw-thread $f'$ is mounted a nut K, which serves to wedge the cap H upward, and thus more firmly bind the rubber tube in place. The upper end of the rubber tube is bound on the conical face $f^4$ by means of the internally-tapered sleeve M, which is forced downward by the nut Q, which works on the screw-thread $f^6$ on the block F. Thus each end of the rubber tube is securely closed. Over the sleeve $m$ is slipped the upper cap P, which is secured in place by the nut N, which engages the thread $m$, cut on the outside of the sleeve M. Thus the distance between the faces $h$ and $p$ of the caps H and P is readily adjusted, permitting thereby the use of rings of different heights not exceeding the height of the exposed portion of the rubber tube extending from the face $h$ of the cap H to the lower end of the sleeve M.

R represents the cement to be tested, which is preferably in the form of an unbroken ring, which may be in the form of an ellipse or may be polygonal, if desired.

In practice the upper end of the cement-holder, which comprises the cap P and nut N, is removed from the apparatus. The ring R is slipped over the nut Q and sleeve M until it rests on the face $h$ of the lower cap H. Then the cap P is placed over the sleeve M and further secured in place by the nut N, which slips over the nut Q and engages the thread $m$ on the sleeeve M and is screwed down until the lower face $p'$ of the upper cap P rests on the ring R. The parts being in place and the cylinder A charged with fluid and the piston-rod B screwed down, the fluid will be under pressure, which will distend the rubber tube I between the faces $h$ and $p'$ of the two caps H and P and will press against the interior of the ring R. The pressure will be indicated by the gage E, and the pressure will increase accordingly as the piston is screwed farther down. When the limit of the strength of the material is reached, the ring R will be ruptured, as indicated at $r$ in Fig. 1, and the pressure will fall, owing to the further extension of the rubber tube.

By the use of the herein-described apparatus a uniform pressure is thus secured over the entire inner surface of the ring R, and up to the moment of rupture every section of the ring is under exactly the same stress, this assuming that the walls of the ring are everywhere of equal thickness. It will also be evident that all rings of the same size will be subjected to exactly the same conditions so far as the application of the pressure is concerned and that any differences in the pressures at which different rings are ruptured must be occasioned by a corresponding difference in the strength of the rings. In other words, the apparatus subjects each specimen to precisely similar conditions without subjecting one to different strains from another, which is the case with the usual method of making tensile tests of cement or like material.

Another feature of the invention is that there will necessarily be more or less air in the apparatus, and this will act as a cushion, preventing all possibility of any shock being given to the specimen while under stress.

Since, as is well known from the theory of hydraulic pressure, the bursting strain on any hollow cylinder due to pressure applied from within does not depend upon the length of said cylinder, it does not make any difference, therefore, whether these rings be long or short vertically, provided the height of each ring is uniform throughout. It therefore is not material whether all the rings are of the same height, provided each individual ring has all of its vertical elements of an equal height. Moreover, it is well known that the average unit strain which a section of the rings sustains has the same ratio to the pressure units registered by the gage that the inside radius of the ring has to its thickness. While the average tensile strength thus obtained for a ring under internal pressure is not the maximum tensile strength developed in the ring, at the same time the comparative values of strength of the materials of different rings of like dimensions can be deduced, and this is the chief aim not only of tensile tests of cement, but of a large variety of tests on other materials. It will be evident that the greater the ratio between the inside radius and the thickness of the cement rings the nearer will it be possible to show the maximum tensile strength of the cement.

If it were practical to make extremely thin rings, an exceedingly close approximation to the maximum tensile strength of the rings could be determined. This is not ordinarily practicable; but the same results can be obtained in a somewhat different way, as follows: After having made a comparatively thick ring — one thick enough to give requisite strength so that it can stand ordinary handling — saw-cuts are made in opposite sides of the ring parallel to its axis. The ring should be sawed from the outside until the thickness of the section remaining uncut is relatively small compared to the inside radius of the ring. In this way it is possible to test an extremely thin strip of the material.

In preparing the cement rings I prefer to mold them in suitable molds and to grind down the ends, so that they will present true surfaces to the abutting faces of the caps, thus preventing the rubber tube from blowing out between the test specimen and the metallic caps which abut against it. I also prepare rings from slabs of the material to be tested by boring with suitable drills or other means. I have referred to the invention as used in connection with the test of cement; but it will be obvious that it may be used in testing rocks of various kinds, gutta-percha, sulfur, bands of paper, and various other articles whose tensile strength is not beyond the limits of the apparatus. It will also be evident that by making the piston-rod B large and fitting snugly into the nut $a$ or properly packed in the head of the cylinder the necessity for a piston may be dispensed with, since forcing the large piston-rod into the cylinder will displace the fluid and will create the requisite amount of pressure.

It will be obvious that gas may be used instead of a liquid; but I prefer a liquid, because of its being practically incompressible. Moreover, in place of the cylinder A any suitable source of pneumatic or hydraulic pressure may be used, if desired. It will also be obvious that various modifications might be made in the herein-described apparatus which could be used without departing from the spirit of my invention.

Having thus described my invention, what I claim, and desire to secure by Letters Patent of the United States, is—

1. A pressure-testing apparatus, comprising a source of fluid-pressure, a perforated block connected thereto, an elastic diaphragm inclosing a portion of said block and adapted to be distended by said pressure, and rigid caps mounted over and spaced apart on said block and provided with faces to abut against the ends of the specimen being tested, substantially as described.

2. A pressure-testing apparatus, comprising a source of fluid-pressure, a perforated block connected thereto, an elastic diaphragm inclosing a portion of said block and adapted to be distended by said pressure, and rigid caps mounted over and spaced apart upon said block and provided with faces to abut against the ends of the specimen being tested, and a gage also connected to the source of fluid-pressure for indicating the pressure applied to the interior of said diaphragm, substantially as described.

3. A pressure-testing apparatus, comprising a source of fluid-pressure, a perforated block connected thereto and tapered toward both ends, an elastic diaphragm clamped over and extending between said tapered portions of said block and adapted to be distended by said pressure, and rigid caps mounted over and spaced apart on said block and provided with faces to abut against the ends of the specimen being tested, substantially as described.

4. A pressure-testing apparatus, comprising a source of fluid-pressure, a perforated block connected thereto and tapered toward both ends, an elastic diaphragm clamped over and extending between said tapered portions of said block and adapted to be distended by said pressure, and rigid caps mounted over and spaced apart on said block and provided with faces to abut against the ends of the specimen being tested, with a gage also connected to the source of fluid-pressure for indicating the pressure applied to the interior of said diaphragm, substantially as described.

5. A pressure-testing apparatus, comprising a fluid-pressure cylinder with piston and piston-rod, a perforated block connected thereto, an elastic diaphragm inclosing a portion of said block and adapted to be distended by said pressure, and rigid caps mounted over and spaced apart on said block and provided with faces to abut against the ends of the specimen being tested, substantially as described.

6. A pressure-testing apparatus, comprising a fluid-pressure cylinder with piston and piston-rod, a perforated block connected thereto, an elastic diaphragm inclosing a portion of said block and adapted to be distended by said pressure, and rigid caps mounted over and spaced apart upon said block and provided with faces to abut against the ends of the specimen being tested, with a gage also connected to the source of fluid-pressure for indicating the pressure applied to the interior of said diaphragm, substantially as described.

7. In a pressure-testing apparatus, the combination with a source of fluid-pressure, of a perforated block connected thereto, and an elastic diaphragm inclosing a portion of said block and adapted to be distended by said pressure and non-yielding abutments, said abutments being adapted to fit against the substance which is being tested, substantially as described.

8. In a pressure-testing apparatus, the combination with a source of fluid-pressure, of a perforated block connected thereto, an elastic diaphragm inclosing a part of said block and adapted to be distended by said pressure, a gage connected to the source of fluid-pressure for indicating the pressure applied to the interior of said diaphragm and non-yielding abutments against which the substance undergoing the test is placed, substantially as described.

9. A pressure-testing apparatus, comprising a source of fluid-pressure, a perforated block connected thereto and tapered toward both ends, a rubber tube clamped over and extending between said tapered portions of said block and adapted to be distended by said pressure, and rigid caps mounted over and spaced apart on said block and provided with faces to abut against the ends of the specimen being tested, substantially as described.

10. A pressure-testing apparatus, comprising a source of fluid-pressure, a perforated block connected thereto and tapered toward both ends, a rubber clamped over and extending between said tapered portions of said block and adapted to be distended by said pressure, and rigid caps mounted over and spaced apart on said block and provided with faces to abut against the ends of the specimen being tested, with a gage also connected to the source of fluid-pressure for indicating the pressure applied to the interior of said diaphragm, substantially as described.

In testimony whereof I affix my signature in presence of two witnesses.

ARTHUR NEWHALL JOHNSON.

Witnesses:
MAY L. JOHNSON,
WM. P. ASH.